United States Patent
Komuro et al.

(10) Patent No.: US 8,588,975 B2
(45) Date of Patent: Nov. 19, 2013

(54) ROBOT SAFETY MONITOR DEVICE, AND ROBOT SAFETY MONITOR METHOD

(75) Inventors: Katsuhiro Komuro, Takahama (JP); Toshio Aono, Chiryu (JP)

(73) Assignee: JTEKT Corporation, Osaka-shi (JP)

( * ) Notice: Subject to any disclaimer, the term of this patent is extended or adjusted under 35 U.S.C. 154(b) by 1092 days.

(21) Appl. No.: 12/362,686

(22) Filed: Jan. 30, 2009

(65) Prior Publication Data

US 2009/0198379 A1 Aug. 6, 2009

(30) Foreign Application Priority Data

Feb. 5, 2008 (JP) ................. 2008-024780

(51) Int. Cl.
| | |
|---|---|
| *G05B 19/18* | (2006.01) |
| *G05B 9/02* | (2006.01) |
| *G05B 23/02* | (2006.01) |
| *G06K 7/00* | (2006.01) |
| *B23Q 15/22* | (2006.01) |
| *B23Q 3/155* | (2006.01) |

(52) U.S. Cl.
USPC ........... 700/250; 700/255; 483/1; 483/2; 483/9; 318/563; 318/565; 901/41

(58) Field of Classification Search
USPC ......... 700/245–270; 901/1, 30–47; 483/1–69; 318/563, 565
See application file for complete search history.

(56) References Cited

U.S. PATENT DOCUMENTS

| | | | |
|---|---|---|---|
| 4,404,506 A | | 9/1983 | Nishimura et al. |
| 4,620,362 A | * | 11/1986 | Reynolds .................. 483/9 |
| 4,670,849 A | * | 6/1987 | Okada et al. .................. 700/87 |
| 4,697,979 A | * | 10/1987 | Nakashima et al. .......... 700/247 |
| 4,799,408 A | * | 1/1989 | Elman ............................ 82/1.11 |
| 4,816,733 A | * | 3/1989 | Sakakibara et al. ..... 318/568.22 |

(Continued)

FOREIGN PATENT DOCUMENTS

| | | |
|---|---|---|
| DE | 200 10 529 U1 | 10/2000 |
| JP | 62-63042 | 3/1987 |

(Continued)

OTHER PUBLICATIONS

Notification of Reason(s) for Refusal issued May 29, 2012 in Japanese Patent Application No. 2008-024780 (with Partial English translation).

(Continued)

*Primary Examiner* — Khoi Tran
*Assistant Examiner* — Abby Lin
(74) *Attorney, Agent, or Firm* — Oblon, Spivak, McClelland, Maier & Neustadt, L.L.P.

(57) ABSTRACT

It is determined whether the first tool identification information that is output from a robot control device, and that indicates a present tool and the second tool identification information for detecting and identifying a tool attached to the robot are unequal to each other. The position coordinates of the taught reference point in an actual space of the robot occurring at the time when the unequalness therebetween is first detected are set as reference coordinates, and a region that contains the reference coordinates is set as a predetermined region. If the position coordinates of the taught reference point have come to exist outside the predetermined region during a period during which it is determined that the foregoing two pieces of information are unequal, an emergency stop signal for causing the robot to be in a safe state is output.

14 Claims, 6 Drawing Sheets

(56) References Cited

U.S. PATENT DOCUMENTS

| | | | |
|---|---|---|---|
| 5,162,713 A * | 11/1992 | Mohri et al. | 318/568.19 |
| 5,257,199 A | 10/1993 | Tsujino et al. | |
| 5,654,618 A * | 8/1997 | Roper | 318/578 |
| 6,208,105 B1 * | 3/2001 | Kato et al. | 318/568.24 |
| 7,783,386 B2 * | 8/2010 | Merte et al. | 700/255 |
| 2002/0038855 A1 * | 4/2002 | Hwang | 250/559.29 |
| 2004/0249508 A1 * | 12/2004 | Suita et al. | 700/245 |
| 2005/0065647 A1 | 3/2005 | Perry et al. | |
| 2006/0033462 A1 * | 2/2006 | Moridaira | 318/568.12 |
| 2006/0161302 A1 * | 7/2006 | Perry et al. | 700/245 |
| 2006/0292308 A1 * | 12/2006 | Clifford et al. | 427/427.2 |
| 2008/0021597 A1 * | 1/2008 | Merte et al. | 700/255 |
| 2009/0069936 A1 * | 3/2009 | Kock et al. | 700/254 |
| 2009/0088898 A1 * | 4/2009 | Nihei et al. | 700/253 |
| 2011/0113939 A1 * | 5/2011 | Simon | 83/13 |

FOREIGN PATENT DOCUMENTS

| | | |
|---|---|---|
| JP | 2-308309 | 12/1990 |
| JP | 5-318239 | 12/1993 |
| JP | 6-179190 | 6/1994 |
| JP | 6-344285 | 12/1994 |
| JP | 2662864 | 6/1997 |
| JP | 2001-525263 | 12/2001 |

OTHER PUBLICATIONS

Extended European Search Report issued Apr. 19, 2012, in European Patent Application No. 09152053.6.

* cited by examiner

| SOLID BODY No. | REFERENCE POINT | THREE SIDES |
|---|---|---|
| 1 | $X_{10}, Y_{10}, Z_{10}$ | $X_1, Y_1, Z_1$ |
| 2 | $X_{20}, Y_{20}, Z_{20}$ | $X_2, Y_2, Z_2$ |
| ⋮ | ⋮ | ⋮ |
| k | $X_{k0}, Y_{k0}, Z_{k0}$ | $X_k, Y_k, Z_k$ |
| ⋮ | ⋮ | ⋮ |
| n | $X_{n0}, Y_{n0}, Z_{n0}$ | $X_n, Y_n, Z_n$ |

| SPHERE No. | CENTER | RADIUS |
|---|---|---|
| 1 | $X_{10}, Y_{10}, Z_{10}$ | $r_1$ |
| 2 | $X_{20}, Y_{20}, Z_{20}$ | $r_2$ |
| ⋮ | ⋮ | ⋮ |
| k | $X_{k0}, Y_{k0}, Z_{k0}$ | $r_k$ |
| ⋮ | ⋮ | ⋮ |
| n | $X_{n0}, Y_{n0}, Z_{n0}$ | $r_n$ |

FIG. 8

ROBOT SAFETY MONITOR DEVICE, AND ROBOT SAFETY MONITOR METHOD

INCORPORATION BY REFERENCE

The disclosure of Japanese Patent Application No. 2008-024780 filed on Feb. 5, 2008 including the specification, drawings and abstract is incorporated herein by reference in its entirety.

BACKGROUND OF THE INVENTION

1. Field of the Invention

The invention relates to a robot safety monitor device and a robot safety monitor method that monitor safety at the time of a tool change of a robot.

2. Description of the Related Art

Robot safety monitor devices for monitoring whether or not a movement path of a taught reference point of a robot is within a predetermined safe range that does not interfere with other objects, for example, the devices described in Japanese Patent No. 2662864 and Published Japanese Translation of PCT application No. 2001-525263 (JP-A-2001-525263), etc., have been widely known. In these devices, the robot is emergently stopped if the taught reference point where the robot receives a movement command is not within an action-permitted range.

However, the foregoing technologies of Japanese Patent No. 2662864 and Published Japanese Translation of PCT application No. 2001-525263(JP-A-2001-525263) are designed to monitor the movement path of a taught reference point, such as a tool's distal end, or the like, and no technology that improves the safety in conjunction with the change of tools has been developed. A robot control device controls the position and the speed of a taught reference point of a robot, and the posture of a tool, and outputs the angles of various axes of the robot to a robot safety monitor device in real time. At this time, besides the angles of the axes, tool identification information for identifying the tool that is attached to the robot's flange is output to the robot safety monitor device in real time. As for the tool change, the robot control device alters the tool identification information and outputs it to the outside at the time point when a tool change program is started. After that, with regard to a new tool, the taught reference point of the tool's distal end or the like is newly set, and command values in the coordinates of the axes of the robot are computed such that the taught reference point moves on a predetermined movement path, and are output to a servo control device. The robot safety monitor device inputs the axis command values that are output from the robot control device in real time, and finds, from these values, the coordinates of the taught reference point, such as the tool's distal end or the like, in the actual space, and then monitors a movement path of the taught reference point in the actual space. When tools are changed, the position and the posture of a tool's distal end relative to the flange center change, so that a change also occurs regarding the equation of the conversion from the axis command values to the space coordinates of the taught reference point. Therefore, the robot safety monitor device inputs the tool identification information that is output from the robot control device in real time. When a tool is changed to another, the monitor device uses a new conversion equation that corresponds to the new tool to find from the axis command values the space coordinates of the taught reference point, such as the tool's distal end or the like, and then determines whether or not the movement paths of the space coordinates exist in the action permitted region.

Thus, when there occurs a change regarding the tool identification information that is output from the robot control device in real time, the robot safety monitor device determines that tools have been changed. However, the time when the attachment of a tool to a flange of the robot is completed is naturally different from the time point at which the robot control device outputs the identification information of the new tool. During a deviation period between the time of completion of the tool change in reality and the time when the robot control device outputs the new tool identification information, the taught reference point, such as the position of the tool's distal end or the like, that the robot safety monitor device manages is different from the actual one. This gives rise to a problem of the safety monitoring becoming insufficient. Thus, the position control or the monitoring of position is performed with respect to the taught reference point, such as a tool's distal end or the like. Therefore, if despite a tool change, the position of the distal end of the old tool or the like is still used as a basis for performing the position control or the safety monitoring, that position is different from the actual position of the distal end of the presently used tool, thus giving rise to a problem in safety.

Therefore, if the completion of attachment of a new tool to a flange of the robot is actually detected and then the detection signal is output, together with the tool identification information, to the robot safety monitor device, the tool identification information and the information regarding the time point of the tool change are provided in a redundant manner, so that safety will be improved. However, as for the robot safety monitor device, a time difference occurs between the tool identification information output from the robot control device, and the real tool attachment completion signal and the tool identification information that are newly input. Regarding this time difference, it is not clear how to perform safety monitoring.

SUMMARY OF THE INVENTION

The invention realizes a robot safety monitor device and a robot safety monitor method that improve the safety of a robot during tool change.

A first aspect of the invention is a robot safety monitor device that monitors safety at a time of a tool change of a robot, including: an action displacement amount input portion that inputs a command value which is output from a robot control device that controls the robot, and which concerns an action displacement amount of a motor that drives each axis of the robot, or an actual value which is output from a servo control device that drives the axis, and which concerns the action displacement amount of the motor; a position coordinates calculation portion that calculates position coordinates of a taught reference point in an actual space of the robot that moves in association with a change in the action displacement amount, based on the command value or the actual value input by the action displacement amount input portion; a first tool identification information input portion that inputs first tool identification information which is output from the robot control device, and which is used by the robot control device for a management purpose, and which indicates a present tool; a second tool identification information input portion that inputs second tool identification information for detecting and identifying a tool attached to the robot; a determination portion that compares the first tool identification information input by the first tool identification information input portion and the second tool identification information input by the second tool identification information input portion, and that determines whether or not the first tool identification information and the second tool identification information are unequal; a region setting portion that sets a proper predetermined region regarding the tool change in the actual space; and an emergency stop signal output portion that outputs emergency stop signal for causing the robot to be in a safe state if during a period during which it is determined by the determination portion that the first tool identification information and the second tool identification information are unequal, the position coordinates of the taught reference point calculated by the position coordinates calculation portion have come to exist outside the predetermined region set by the region setting portion.

In this construction, the region setting portion may set, as reference coordinates, the position coordinates of the taught reference point that are calculated by the position coordinates calculation portion as occurring at a time when unequalness between the first tool identification information and the second tool identification information is first detected by the determination portion, and may set a region that contains the reference coordinates as the predetermined region. That is, even if the two pieces of tool identification information are not equal, it is determined to be safe and emergency stop is not performed provided that the amount of movement of the taught reference point during the period of the unequalness between the two pieces of tool identification information from the coordinates of the taught reference point occurring when the unequalness is first detected is within a predetermined range.

The region setting portion may set, as the predetermined region, a predetermined tool change region determined according to the tool identification information. The robot safety monitor device may further include a velocity computation portion that computes a moving velocity of the taught reference point from a time-dependent change of the position coordinates calculated by the position coordinates calculation portion. Furthermore, even in a case where the position coordinates of the taught reference point exist in the predetermined region during a period during which the unequalness between the first tool identification information and the second tool identification information is detected by the determination portion, the emergency stop signal output portion may output the emergency stop signal if the velocity calculated by the velocity computation portion becomes greater than or equal to a predetermined value. In this case, since the location of tool change is known beforehand, it is determined to be safe to a worker as well if the movement of the taught reference point is at the tool change location. Therefore, if during a period during which the two pieces of tool identification information are unequal, the taught reference point is not out of the predetermined region, it is determined to be safe, and the emergency stop is not performed. In the case where the tool change position is different for each tool, it is also permissible to set different predetermined regions corresponding to the pieces of tool identification information regarding the tools.

In this construction, the taught reference point of the robot is a reference point that is defined relative to a moving member of the robot so as to specifically determine an action pathway of the robot. For example, the taught reference point of the robot is a flange center point, a tool center point, a tool distal end point, etc. The position of the taught reference point can vary depending on the content of work that the robot is caused to perform. The taught reference point is a point for designating the position in the actual space in the case where the position and the posture of the robot are to be taught by a program or in a manual operation. The number of axes (degree of freedom) of the robot may be arbitrary. Each of the foregoing motors do not need to be a motor that has a rotor; for example, each motor may also be a linear motor or the like.

Various kinds of devices may be used as a device that detects whether a tool has been attached to a flange of the robot. In an example of a conceivable device, each tool is provided with an IC tag that transmits tool identification information, and a contact switch that detects completion of attachment of a tool to a flange, and during the period during which the contact switch is on, the device transmits the tool identification information stored in the IC tag. In another conceivable device, a contact switch may be provided, and a bar code carrying coded tool identification information, a two-dimensional code, a magnetic tape, etc. may be attached to an external portion of the tool, and may be read by an optical reader device, a magnetic reader device, etc., and tool identification information may be output to the robot safety monitor device. The tool may be provided with a dip switch that has been set in the on/off positions corresponding to its tool identification information, and a contact sensor, and the value of the dip switch may be output to the robot safety monitor device during a period during which the contact sensor is on. Furthermore, the completion of the action of a tool changing device with a constant load is output as an attachment completion signal to the flange of the tool, and the tool identification information recognized by the tool change device may be output as the second tool identification information to the robot safety monitor device.

The effects achieved by the first aspect of the invention are as follows. That is, according to the first aspect of the invention, in conjunction with tool change, the first tool identification information that is output from the robot control device in real time, and the second tool identification information that is the identification information of a detected tool that is actually attached to a hand of the robot are input to the robot safety monitor device. Therefore, with regard to the tool change of the robot, information is provided in a redundant manner, and therefore correct tool information can be determined by equality between two pieces of tool information. Thus, safety improves. Even if the first tool identification information and the second tool identification information are not equal, the emergency stop signal is not output until the position coordinates of the taught reference point go out of the predetermined region with the unequalness therebetween maintained. Therefore, even if the first tool identification information and the second tool identification information are unequal, the emergency stop signal is not output in the case where the position coordinates of the taught reference point are within the predetermined region. Of course, if the first tool identification information and the second tool identification information become equal to each other while the position coordinates of the taught reference point are located within the predetermined region, the emergency stop signal is not output. Thus, by properly setting the predetermined region in a region where safety is secured for a worker, it is possible to secure safety while the two pieces of tool identification information are unequal. Then, the provision of tool information in a redundant manner will allow improvement of the safety regarding tool change, and will exclude an unnecessary emergency stop that is caused by unequalness of two pieces of tool information. Thus, safety and work efficiency can both be improved.

The region setting portion may be constructed so as to set as reference coordinates the position coordinates of the taught reference point that are calculated by the position coordinates calculation portion as occurring at a time when unequalness between the first tool identification information and the second tool identification information is first detected by the determination portion, and so as to set a region that contains the reference coordinates as the predetermined region. Usually, the tool change is performed at a position that is safe for the worker. It is considered that at the time of tool change, the taught reference point will hardly move, and the posture thereof will not greatly change. Therefore, it is considered to be the start of a tool change when the first tool identification information and the second tool identification information are first unequal to each other. Therefore, if the position coordinates of the taught reference point at the time of start are set as reference coordinates and a region that contains the reference coordinates is set as a predetermined region, the amount of movement of the taught reference point at the time of tool change can be properly restricted. If the two pieces of tool identification information are unequal to each other when the taught reference point goes out of the predetermined region for the first time, the emergency stop signal is output for the first time. In this manner, safety can be properly improved.

The predetermined region may be set as a tool change region in the actual space. In this case, if the two pieces of tool identification information are unequal in a tool change region that has high safety, it can be considered that the tool change is being performed at a proper location that has high safety, and therefore the emergency stop signal is not allowed to be output. If the two pieces of tool identification information remain unequal even after the taught reference point goes out of the predetermined region, the emergency stop signal is output for the first time. In this manner, safety can be properly improved.

Even in the case where the taught reference point exists within the predetermined region during the period during which the two pieces of tool identification information are unequal, the emergency stop signal may be output if the moving velocity of the taught reference point is greater than or equal to a predetermined value. At the time of tool change, the moving velocity of the taught reference point is considered to be slow. Therefore, even if while the two pieces of tool identification information are unequal, the taught reference point exists within the predetermined region where safety is secured, it is conceivable that the moving velocity of the taught reference point has increased for some cause. Therefore, by outputting the emergency stop signal in such a case, safety can be further improved.

A second aspect of the invention is a robot safety monitor method that monitors safety during a tool change of a robot. The method includes: inputting a command value which is output from a robot control device that controls the robot, and which concerns an action displacement amount of a motor that drives each axis of the robot, or an actual value which is output from a servo control device that drives the axis, and which concerns the action displacement amount of the motor; calculating position coordinates of a taught reference point in an actual space of the robot that moves in association with a change in the action displacement amount, based on the command value or the actual value; inputting first tool identification information that is output from the robot control device, and that is used by the robot control device for a management purpose, and that indicates a present tool; inputting second tool identification information for detecting and identifying a tool attached to the robot; comparing the first tool identification information and the second tool identification information, and determining whether or not the first tool identification information and the second tool identification information are unequal; setting a proper predetermined region regarding the tool change in the actual space; and outputting an emergency stop signal for causing the robot to be in a safe state if during a period during which it is determined that the first tool identification information and the second tool identification information are unequal, the position coordinates of the taught reference point have come to exist outside the predetermined region.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, the invention will be described in conjunction with concrete embodiments. However, the invention is not limited to the embodiments shown below.

Figure 1:
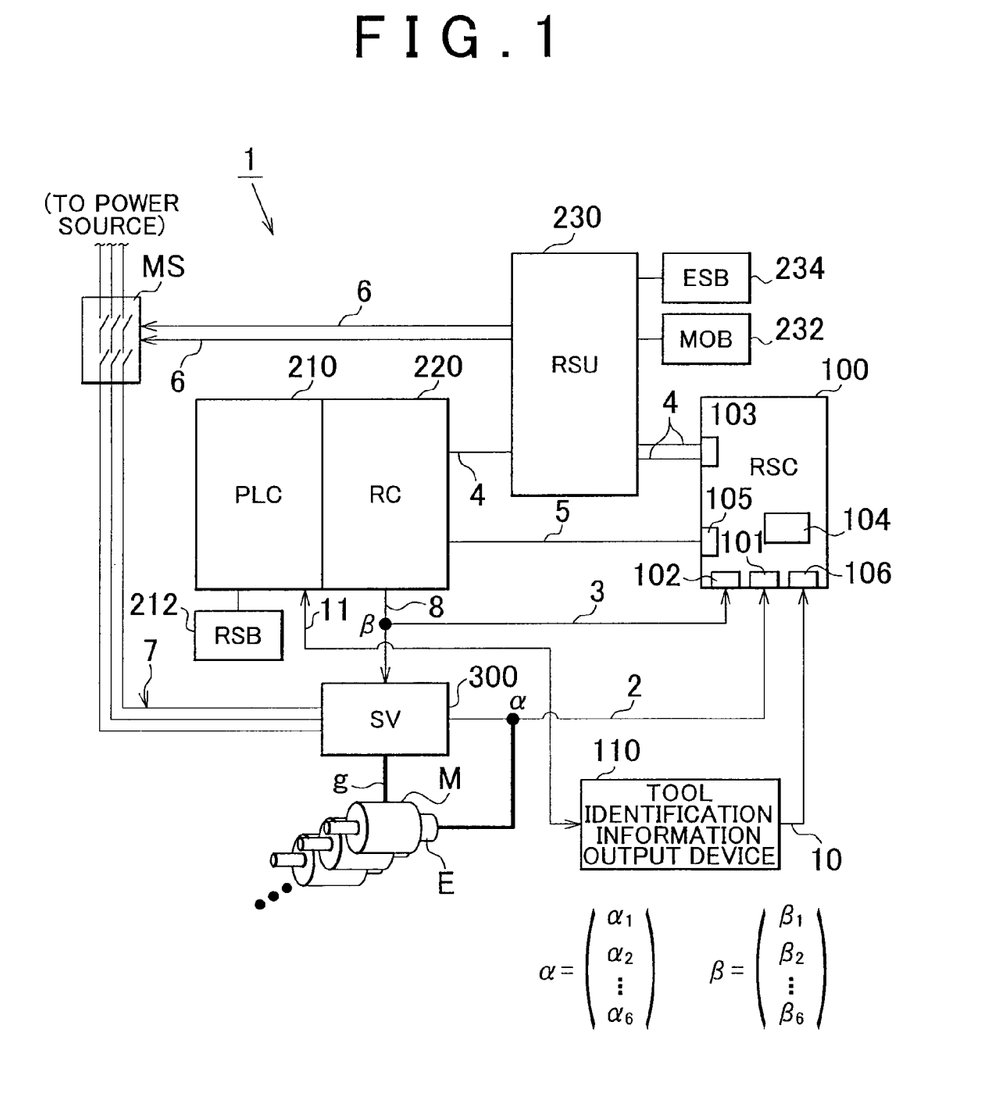
FIG. 1 is a control block diagram showing a main construction of a robot drive control system in accordance with Embodiment 1.

FIG. 1 shows a main construction of a robot drive control system 1 of Embodiment 1. The robot drive control system 1 is constructed mainly of a robot safety unit (RSU, also termed a safety PLC) 230, a robot control device (robot controller (RC)) 220, a programmable logic controller (PLC) 210, a safety monitor device (robot safety controller (RSC)) 100, a servo unit 300, and a tool identification information output device 110. The robot control device 220, the robot safety unit 230, and the safety monitor device 100 are interconnected by a bus 4. The PLC 210 and the robot control device 220 are connected to each other by an internal bus. The robot control device 220 and the safety monitor device 100 are interconnected by a communication line 3 and a communication line 5. The robot control device 220 and the servo unit 300 are interconnected by a communication line 8. The servo unit 300 and the safety monitor device 100 are interconnected by a communication line 2. The tool identification information output device 110 and the safety monitor device 100 are interconnected by a communication line 10. The tool identification information output device 110 and the PLC 210 are interconnected by a communication line 11. Individual axis motors M of a six-axis robot are connected to the servo unit 300. The robot drive control system 1 is a control system for the six-axis robot. FIG. 1 shows three of the six axis motors M of the robot. Although Embodiment 1 shows a six-axis robot, it is also permissible to employ a five-axis robot or robots of other number of axes.

In this system, an electric power needed for the six motors M can be supplied from a predetermined electric power source via power feed lines 7 and the servo unit 300. The electrification/deelectrification state of the power feed lines 7 can be certainly switched individually by electromagnetic switches MS each of which is provided in a series redundant construction. The robot safety unit 230 controls the on/off states of the electromagnetic switches MS by controlling the electrification and deelectrification of the relay coils thereof, via wiring 6. On the basis of the control process of the robot safety unit 230, continuous feed of electricity to a relay coil maintains the conduction state of the electromagnetic switch MS. The robot safety unit 230 is provided with an emergency stop button ESB 234 for commanding an emergency stop performed by a worker, and a master ON-button 232 that makes it possible for a worker to electrify various devices of the system so as to make the system operable. The robot safety unit 230 is made of relay circuits or a programmable logic controller (PLC) so as to control the electromagnetic switches MS that control the power feeding to the motors M, and mainly plays a role of emergency stop. In addition, in order to secure high safety by improving the reliability of the system, the wiring 6 is provided in a redundant construction, and the electromagnetic switches MS are controlled by redundant electric current signals that propagate through the wiring lines 6. The wiring 4 is also of a redundant construction.

The actions of the robot are controlled by the PLC 210, and the robot control device 220 linked to the PLC 210 by the internal bus. The PLC 210 is provided with a robot start button 212 for a worker to command that an action of the robot be started. The PLC 210 performs a sequence control of the entire robot drive control system 1 by executing a program that corresponds to a predetermined ladder diagram. The PLC 210 controls the tool identification information output device 10 to be drivable. The robot control device 220 is provided for executing a positioning control of the robot, and successively outputs to the servo unit 300 a command value $\beta$ regarding the rotation angle of each of the shafts of the motors M in real time. The robot control device 220 outputs the command value $\beta$ also to the safety monitor device 100 via the communication line 3 in real time. An encoder E is directly coupled to the rotation shaft of each motor M, and successively detects a real value regarding the rotation angle of the shaft of the motor M, that is, an actual value a, and outputs the actual value $\alpha$ to the safety monitor device 100 via the communication line 2. The servo unit 300 drives and controls the rotation angle of each of the motors M so as to decrease the deviation of the actual value $\alpha$ from the command value $\beta$ by a predetermined programmed feedback control, such as PI, PID, etc. The actual value $\alpha$ is defined as a vector made up of a set of the actual rotation angles $\alpha 1, \alpha 2, \ldots, \alpha 6$ of six motors M. Likewise, the command value $\beta$ is a vector made up of a set of the command rotation angles $\beta 1, \beta 2, \ldots, \beta 6$. However, the unit of these rotation angles may be arbitrary.

The robot control device 220 outputs to the safety monitor device 100 tool identification information regarding a tool presently attached to a flange, that is, tool identification information about a tool that is designated and controlled by a program, as first tool identification information, together with the command value $\beta$, via a communication line 5. The tool identification information output device 110 reads or detects the actual completion of attachment of the tool to the flange of the robot and the identification information about the tool actually attached to the flange, and outputs the identification information about the tool as second tool identification information to the safety monitor device 100 via a communication line 10, in real time. The tool identification information output device 110 can be constructed of a contact sensor that detects a firm contact of a tool with the robot's flange, a reception device that reads information stored in an IC tag that is incorporated in the tool and that stores the second tool identification information, and a transmission device that outputs the second tool identification information. Therefore, at the timing at which the attachment of a new tool to the flange of the robot is actually completed, the tool identification information output device 110 starts to output the second tool identification information about the new tool. Then, during the period during which the tool is attached, the tool identification information output device 110 repeatedly outputs the second tool identification information in real time. At the timing at which the tool is removed from the robot's flange, the output of information showing that the tool is no longer attached to the flange is started. Then, this information continues to be repeatedly output in real time till the timing at which the attachment of a new tool is completed. Next, at the timing when the attachment of a new tool to the flange is completed, the tool identification information about this tool is repeatedly output as second tool identification information.

The safety monitor device 100 is constructed of a microprocessor as a central component, and has input interfaces 101, 102, 103, 105, 106. The input interface 101 is provided for inputting to the safety monitor device 100 the actual value a received from each encoder E via the communication line 2. The input interface 102 of the safety monitor device 100 is provided for inputting to the safety monitor device 100 the command value $\beta$ received from the robot control device 220 via the communication line 3. The input interface 105 is provided for inputting the first tool identification information received from the robot control device 220 via the communication line 5. The input interface 106 is provided for inputting the second tool identification information received from the tool identification information output device 110 via the communication line 10. A memory 104 of the safety monitor device 100 is provided with a program region that stores programs for operating the safety monitor device 100, a predetermined region data storage region that stores data that defines a predetermined proper region for tool change, and a data region that stores other kinds of data.

The wiring 4 connects between the robot control device 220 and the robot safety unit 230, and between the robot safety unit 230 and the safety monitor device 100. In order to improve reliability and secure high safety, the internal circuits in these devices are provided in a redundant construction, and the wiring 4 is also provided in a redundant construction. That is, the signal conducted through the wiring 4 is redundant, and the processes in these units are also redundant, and therefore a certain redundancy of the processes is maintained. A redundant output interface 103 (emergency stop signal output portion) of the safety monitor device 100 is connected to the redundant wiring 4. The B communication line 5 connects the robot control device 220 and the safety monitor device 100.

Figure 2:
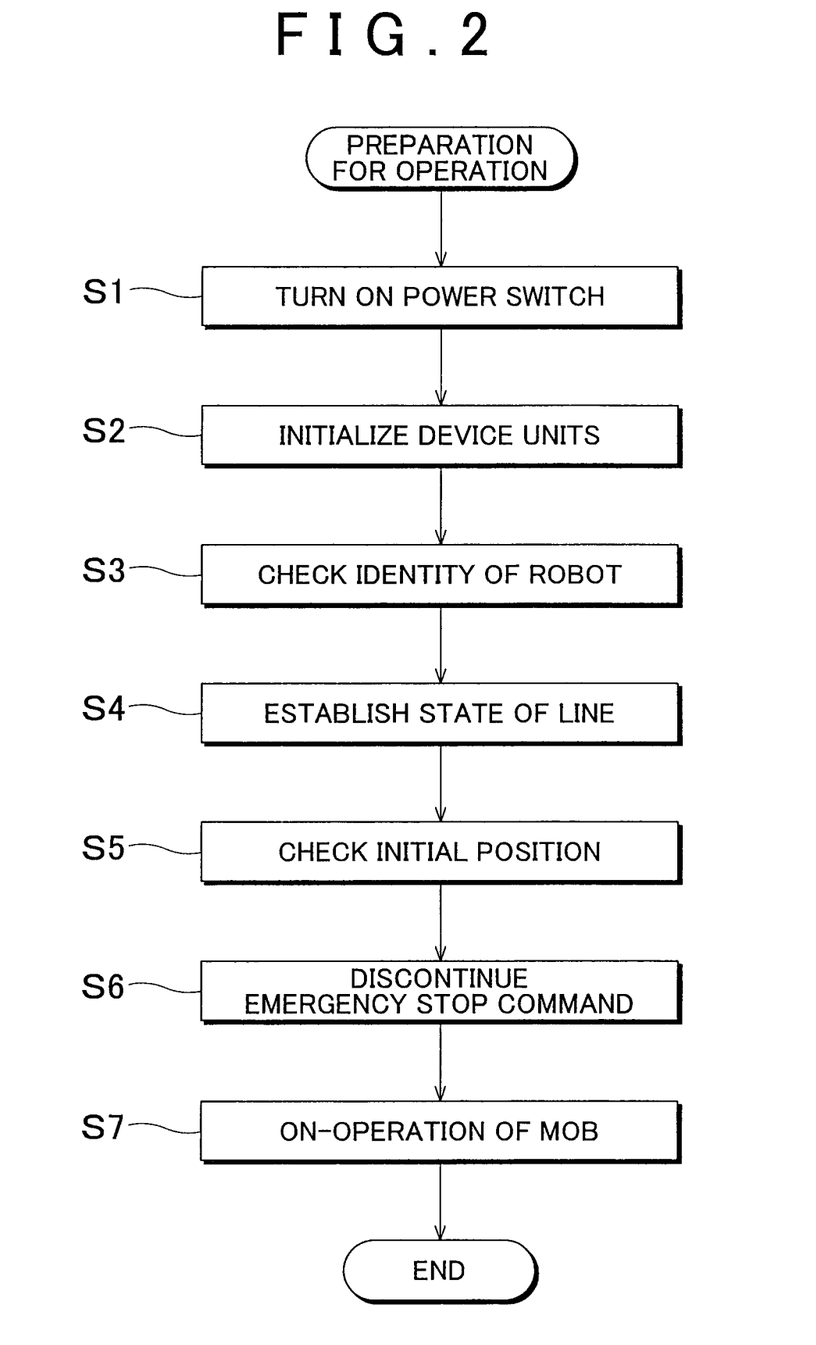
FIG. 2 is a flowchart showing a preparation process procedure of operation of the robot drive control system in accordance with Embodiment 1.

FIG. 2 shows a preparation process procedure for operation of the robot drive control system 1. The preparation process procedure of FIG. 2 is a pre-process procedure that needs to be implemented at the time of restart of the system in order to secure safety and bring the robot drive control system 1 into a ready state in which the system 1 is operable.

In step S1, a worker throws in the power switch provided for feeding electricity to the entire system. At this time, however, the electromagnetic switches MS remain in an off-state, that is, in a state of shutting off the power feeding, so that a state in which mechanical braking is applied to each axis is maintained. Next, in step S2, the foregoing devices (100, 110, 210, 220, 230, 300) are initialized separately for each one of the devices. The initialization processes of these devices are executed by themselves separately for each device.

Next, in step S3, the identity of the robot is checked by the safety monitor device 100. Specifically, it is checked whether or not there was a change about the robot as a drive object during a period from the previous stop of the system until the present startup of the system. This check procedure is carried out by a process of determining whether or not a type parameter of the robot transferred to the safety monitor device 100 from the robot control device 220 via the communication line 5 matches the type parameter of the robot stored in the memory 104. If there is a change of robots, the following preparation procedure is stopped from being executed.

Next, in step S4, the state of the communication line 2 and the state of the communication line 3 are checked and initialized by the safety monitor device 100, so that their line states are made normal. This ensures that the actual value α and the command value β can be reliably transmitted via the communication line 2 and the communication line 3. Next, in step S5, the identity of the actual value α is checked by the safety monitor device 100. This check is based on whether or not there was a change regarding the actual value α during a period from the previous stop of the system till the present start-up of the system. That is, it is determined that the actual position and the posture of the robot coincide with the position and the posture thereof for a management purpose. If coincidence is not established therebetween, it means that a movement or change in the position and the posture of the robot occurred after the robot previously stopped, and therefore that the position and the posture thereof for a management purpose are not at true values, which makes it impossible to control the robot. Therefore, if there was a change in the actual value α, the following preparation procedure is stopped from being executed.

Next, in step S6, the emergency stop signal having been output from the safety monitor device 100 to the robot safety unit 230 via the output interface 103 (emergency stop signal output means) and the wiring 4 is stopped from being output. Therefore, the emergency stop command by the safety monitor device 100 is discontinued.

Finally, in step S7, it is detected whether or not the master ON-button MOB 232 of the robot safety unit 230 has been depressed by a worker. If the depression of the MOB 232 is detected, the robot safety unit 230 determines whether or not a discontinuation of the emergency stop command from the safety monitor device 100, a release of the emergency stop button ESB 234, and a discontinuation of the emergency stop command from another device have all been established. Then, in the case where the foregoing conditions are all established, the robot safety unit 230 causes the electromagnetic switch MS to enter an on-state. Then, the shafts of the robot are released from the mechanical retention, entering a servo-lock state in which the motors M retains a resting posture upon electrification. Therefore, the system enters a ready state in which the robot can start operating at any time.

Figure 3:
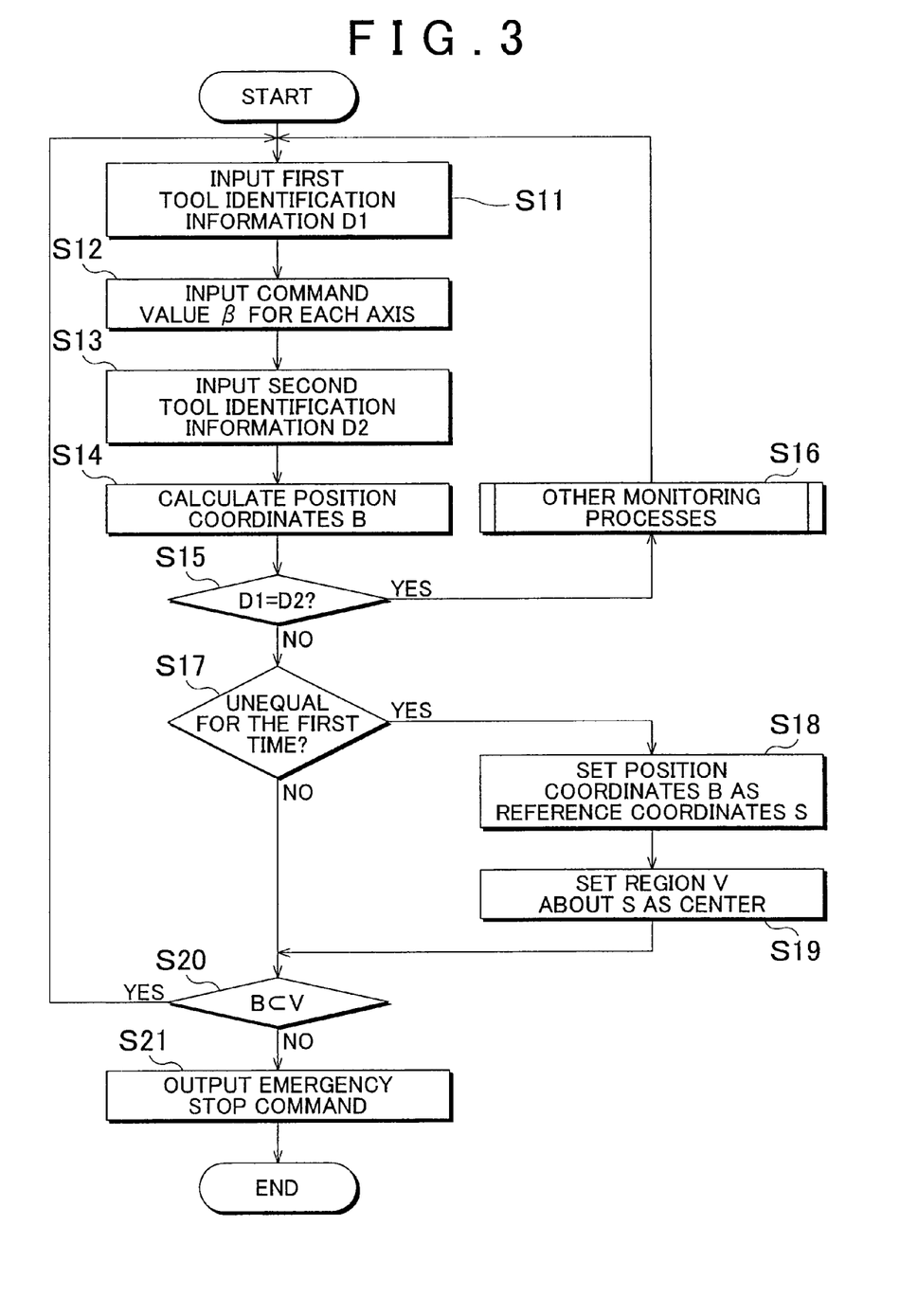
FIG. 3 is a flowchart exemplifying a monitoring process procedure of a safety monitor device in accordance with Embodiment 1.

FIG. 3 shows a monitoring process procedure that is executed by the safety monitor device 100 at the time of tool change during a usual operation that is started by pressing the robot start button RSB 212. Firstly, in step S11, the safety monitor device 100 inputs, via the input interface 105, first tool identification information D1 that is control information used in a program of the robot control device 220 and that is output from the robot control device 220 in real time. Next, in step S12, via the input interface 102, the command values $\beta=(\beta 1, \beta 2, \ldots, \beta 6)$ on the axes for moving the taught reference points to corresponding interpolation points that are output from the robot control device 220 to the servo unit 300 in real time are read.

Next, in step S13, the tool identification information output device 110 reads the identification information about the tool that is actually attached to the flange of the robot at that time, and reads, via the input interface 106, the second tool identification information D2 that has been output. Next, in step S14, the position coordinates B of the taught reference point of the robot that is an object of the position control is found on the basis of the command value β obtained in step S12. In the case where this coordinates are to be defined in an xyz orthogonal coordinate system, it suffices to find coordinate components $(B_x, B_y, B_z)$. Specifically, the rotation angle about each axis is converted into a value in the xyz-orthogonal coordinates system of a taught reference point that is, for example, a tool's distal end point. This conversion technique is a known technique that uses a conversion equation that uses geometric parameters of the robot, such as the length of a robot arm, a tool matrix, etc. Generally, the 4×4 matrix is used as what represents the position and the posture of the taught reference point. Of the matrix components, the components $(B_x, B_y, B_z)$ that represent a position is found as an actual coordinate.

Next, in step S15, it is determined whether or not the read first tool identification information D1 and the read second tool identification information D2 are equal to each other. If the two pieces of tool identification information are equal, there is no problem in the safety regarding the tool change. Then, in step S16, other safety monitor processes are executed; for example, it is determined whether or not the position coordinates B are within a predetermined region, or the like. The safety monitor device 100 then returns to step S11 to repeat the foregoing process. The process time of this circuit is very short, and therefore the delay time by this circuit does not become a problem for safety monitoring.

Next, if it is determined in step S15 that the first tool identification information D1 and the second tool identification information D2 are not equal, the process proceeds to step S17. In step S17, it is determined whether or not this determination of unequalness has been made for the first time in the repetition process. If the present unequalness determination is the first one, the process proceeds to step S18, in which the position coordinates B of the taught reference point computed in step S14 in the present cycle of the repetition loop are set as reference coordinates S.

Next in step S19, a sphere of a radius r about the reference coordinates S as a center is set as a predetermined region V. Next in step S20, it is determined whether or not the position coordinates B of the present taught reference point exists within the predetermined region V. In Embodiment 1, the predetermined region is a sphere of a radius r. Therefore, the predetermined region is a sphere of the radius r about the reference coordinates S as a center, that is, a sphere of the radius r about the taught reference point that is given at the time point at which the two pieces of tool identification information become unequal for the first time. Whether or not the present point of the position coordinates B exists within the sphere of the predetermined region V is determined whether or not the distance between the position coordinates B and the reference coordinates S is less than or equal to the radius r of the sphere. Even if the taught reference point moves, the determination in step S20 that the point of the position coordinates B at the present time point exists within the predetermined region V, the process returns to step S11, so that the foregoing process is repeated.

If a change in which the two pieces of tool identification information have turned equal from the state of being unequal is detected in step S15 while the position coordinates B at the present time point are within the predetermined region despite the taught reference point having been moved, it means that within the predetermined region V, the tool change has certainly been performed and the safety problem has disappeared. Then, the process proceeds to step S16, in which other safety monitoring processes are executed. After that, the process returns to step S11, so as to repeat the foregoing process.

On the other hand, if the taught reference point moves so that it is determined in step S20 that the position coordinates B at the present time point exist outside the predetermined region V while it has continually been determined in step S15 that the two pieces of tool identification information D1, D2 are unequal to each other, the emergency stop signal is output in step S21. That is, in the case where the two pieces of tool identification information D1, D2 are still unequal after the taught reference point has moved out of the predetermined region V set with its center defined at the taught reference point occurring when the two pieces of tool identification information D1, D2 became unequal for the first time, it is determined that the tool change has not been completed within the predetermined region in which safety can be secured, and therefore the emergency stop signal is output. Therefore, the robot is emergently stopped, and further movement thereof is prohibited.

In step S21, the emergency stop signal (RSC-EMS) is output from the output interface 103 of the safety monitor device 100 to the robot safety unit 230, the robot control device 220, and the PLC 210. Therefore the robot safety unit 230 turns off the electromagnetic switch MS, stopping the feed of electricity to the servo unit 300 and the motors M. Mechanical braking is applied to each axis of the robot so that the posture of the robot at the time of the emergency stop is mechanically maintained.

Although in Embodiment 1, the command value $\beta$ for each axis that is output in real time from the robot control device 220 is used to find the position coordinates B of the taught reference point in an actual space, it is also permissible to use an actual value $\alpha$ for each axis that is output in real time from the servo control device 300.

Figure 4:
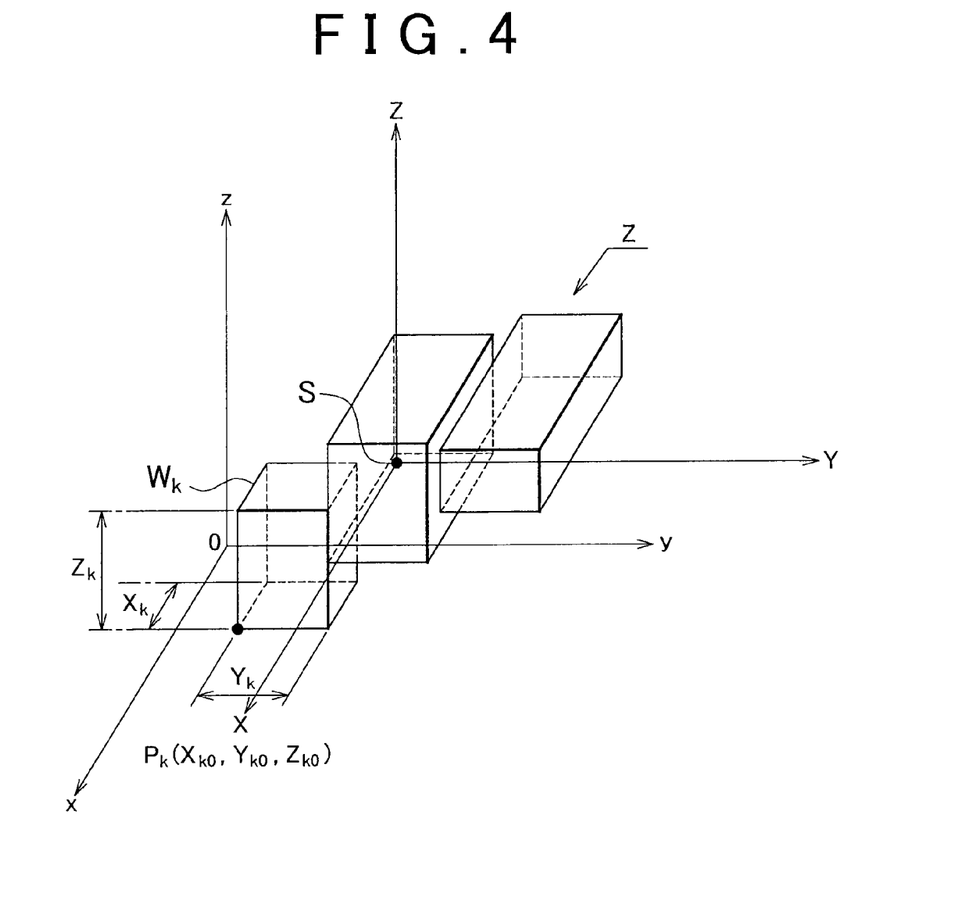
FIG. 4 is an illustrative diagram showing a technique of setting a predetermined region in accordance with Embodiment 1.
Figure 5:
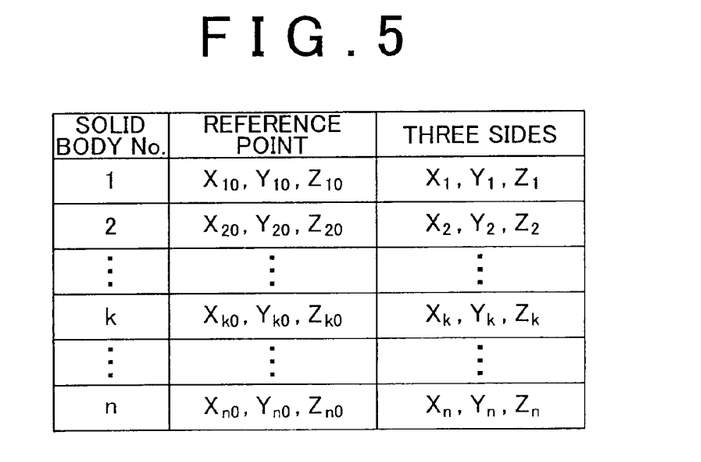
FIG. 5 is a construction diagram showing a memory that stores a predetermined region in accordance with Embodiment 1.

Although a sphere is set as a predetermined region, the predetermined region may also be an arbitrary body, such as a cube, a rectangular parallelepiped, etc. It is also permissible to define the predetermined region by a group of smaller bodies. For example, as shown in FIG. 4, the predetermined region V is approximated by an assembly of many contiguous rectangular parallelepipeds. (The size of the rectangular parallelepipeds is arbitrary and the surfaces thereof may be parallel to the corresponding coordinates planes, and the rectangular parallelepipeds may partially overlap with each other.) FIG. 4 shows an example in which the predetermined region V is approximated by three contiguous rectangular parallelepipeds. One of the vertexes of each rectangular parallelepiped is set as a reference point $P_k$, and the coordinates ($X_{k0}$, $Y_{k0}$ $Z_{k0}$) of the reference point $P_k$ and the three side lengths ($X_k$, $Y_k$, $Z_k$) of each rectangular parallelepiped $W_k$ are stored as a table as shown in FIG. 5 in a predetermined region data storage region in the memory 104. Incidentally, the coordinates ($X_{k0}$, $Y_{k0}$ $Z_{k0}$) of each reference point $P_k$ is a value in a coordinates system O-XYZ defined from the center of the predetermined region V, and is relative coordinates with respect to the center. Besides, the coordinates system o-xyz is a coordinates system in an actual space (the coordinates system fixed on a floor surface to which the robot is fixed). Therefore, if the reference coordinates S (the coordinates in the coordinates system o-xyz) that are the position coordinates B of the taught reference point occurring at the time when the two pieces of tool identification information become unequal for the first time are set, the coordinate values ($x_{k0}$, $Y_{k0}$, $Z_{k0}$) of the reference point $P_k$ in an actual space (the coordinates system o-xyz) can be obtained from the reference coordinates S ($B_x$, $B_y$, $B_z$)+the relative coordinates ($X_{k0}$, $Y_{k0}$, $Z_{k0}$) of the reference point $P_k$.

The determination as to whether or not the position coordinates B at an arbitrary time exist in the predetermined region V is executed by determining whether or not the position coordinates B exist within the rectangular parallelepipeds $W_k$ that constitute the region V. For example, whether or not the position coordinates B exist in the rectangular parallelepiped $W_k$ is determined on the basis whether or not inequalities $x_{k0} \le B_x \le x_{k0}+X_k$, $y_{k0} \le B_y \le y_{k0}+Y_k$, $z_{k0} \le B_z \le z_{k0}+Z_k$ are satisfied. This determination is executed with respect to all the rectangular parallelepiped components. In the case where the position coordinates B do not exist in any one of the rectangular parallelepiped components, it is determined that the position coordinates B do not belong to the predetermined region V.

Figure 6:
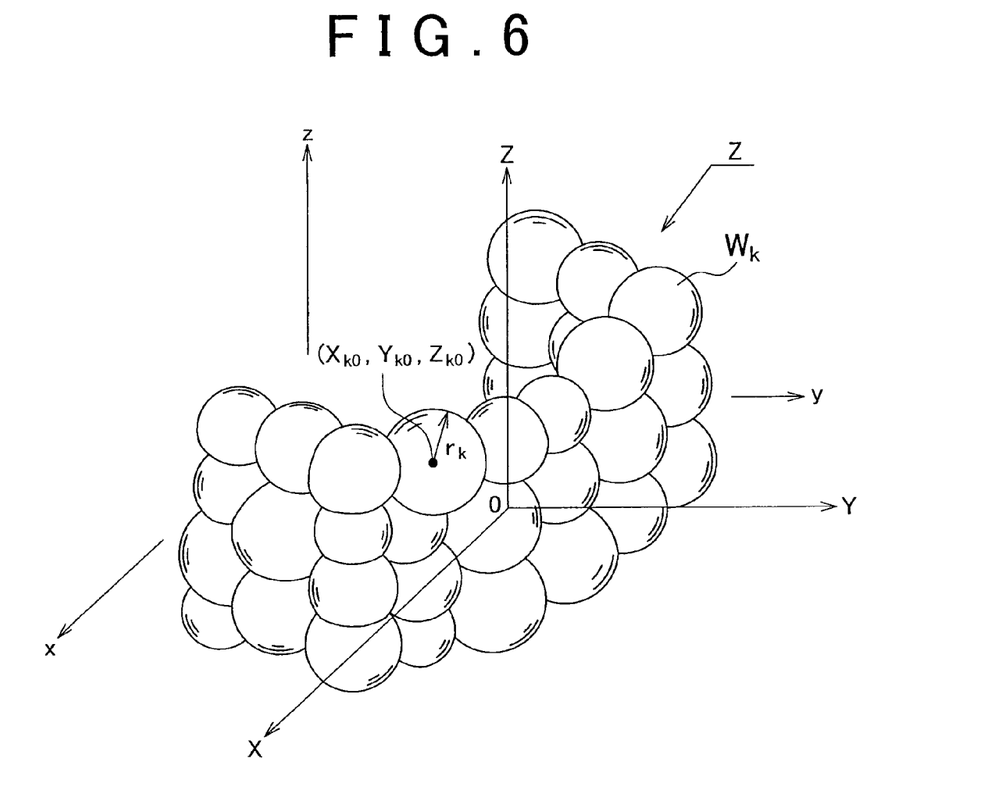
FIG. 6 is an illustrative diagram showing another technique of setting a predetermined region in accordance with Embodiment 1.
Figure 7:
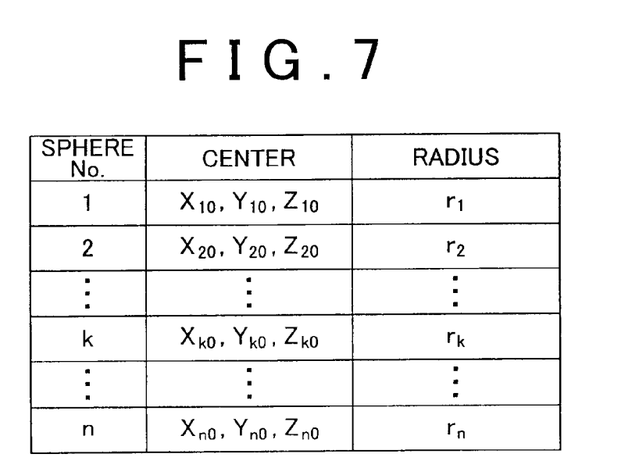
FIG. 7 is a construction diagram showing a memory that stores another predetermined region in accordance with Embodiment 1.

Although the predetermined region V is approximated by the group of the contiguous rectangular parallelepipeds in the foregoing description, the predetermined region V may also be approximated by a group of many contiguous spheres as shown in FIG. 6. (The size of the spheres is arbitrary, and a portion of a sphere may overlap with a portion of another sphere.) In this case, the rectangular coordinates of the center of each sphere and the radius thereof are stored in a table fashion as shown in FIG. 7 in a predetermined region data region in the memory 104. Besides, as stated above, the coordinates of the center of each sphere are relative coordinates in a coordinates system that is set with its origin defined at the center of the predetermined region V.

Although in Embodiment 1, the reference coordinates S are set at the center of the predetermined region V, the reference coordinates S do not need to be limited to the center thereof, but may be an arbitrary position in the predetermined region V. In the case where the reference coordinates S are set at an arbitrary position in a predetermined region that is defined by a group of rectangular parallelepipeds or a group of spheres as described above, the reference coordinates of each rectangular parallelepiped component or the center coordinates of each sphere component are given by relative coordinates with respect to the arbitrary position in the predetermined region.

Embodiment 2

In Embodiment 1, a predetermined region is set by using, as a reference, the position coordinates of the taught reference point at the time when the two pieces of tool identification information become unequal to each other for the first time. Therefore, if the movement region of the taught reference point in the actual space is restricted in a time section in which two pieces of tool identification information are unequal regardless of at what position the tool change position is in the actual space, it is assumed that safety is secured even though the two pieces of tool identification information are unequal. In Embodiment 2, on the other hand, the tool change position in the actual space is known beforehand, and therefore the predetermined region V is not relatively determined with reference to the reference coordinates S, but is defined in absolute coordinates in the actual space. It suffices that if the predetermined region is one sphere, the center coordinates and the radius of the sphere be stored in a predetermined region data region in memory 104, and if the predetermined region is a group of many rectangular parallelepipeds, the absolute coordinates of the reference point $P_k$ and the lengths of the three sides of each of the rectangular parallelepiped components be stored in the predetermined region data region, and if the predetermined region is a group of many spheres, the absolute coordinates of the center $P_k$ and the radius of each of the sphere components be stored in the predetermined region data region. The process procedure of the safety monitor device 100 in this case is similar to the process procedure shown in FIG. 3. However, step S18 is unnecessary, and in step S19, the predetermined region V defined by absolute coordinates fixed in the actual space is used, and in step S20, it is determined whether or not the position coordinates B of the taught reference point exist in the predetermined region V. Other features and the like are the same as those in Embodiment 1.

Embodiment 3

Figure 8:
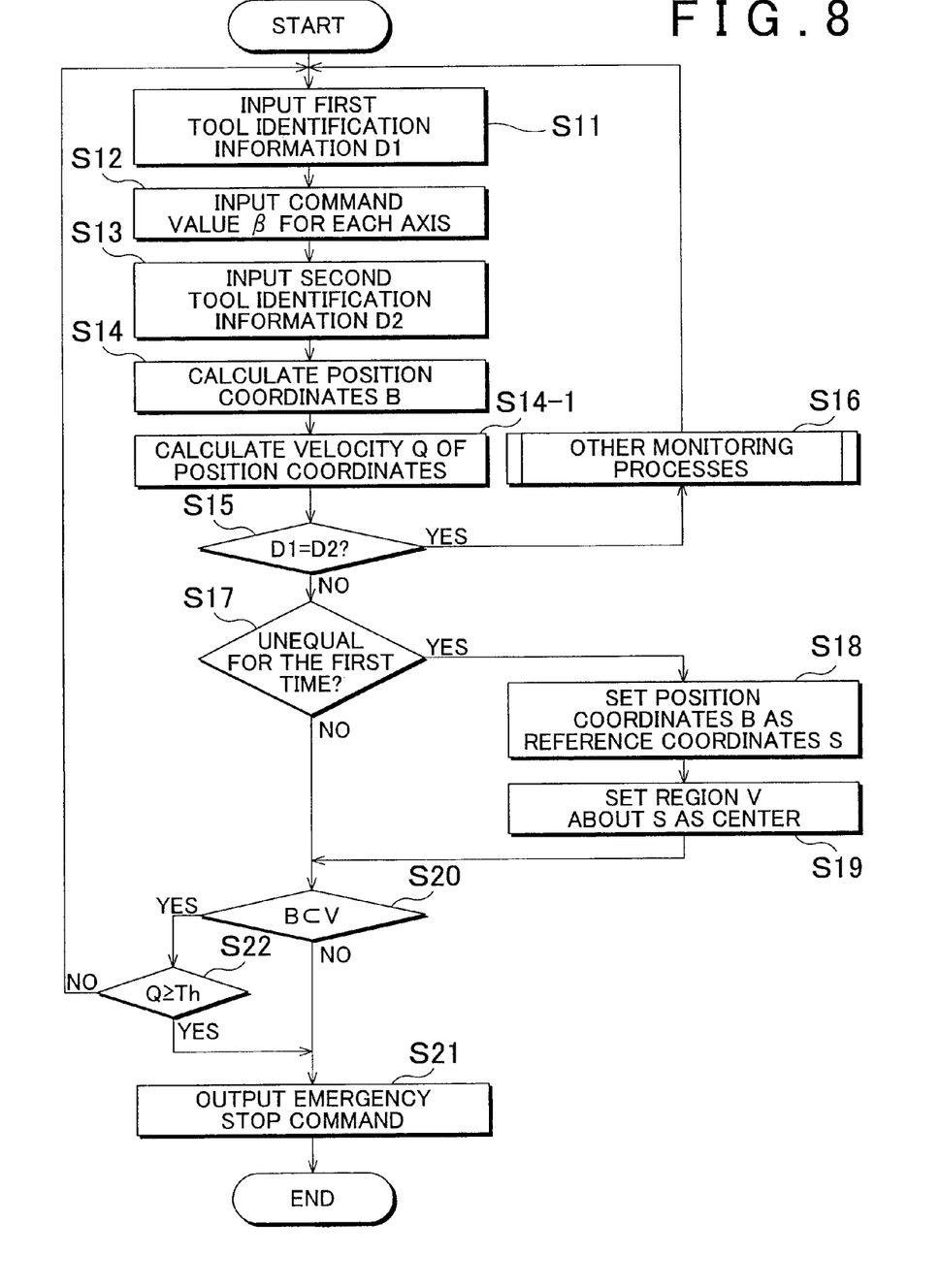
FIG. 8 is a flowchart exemplifying a monitoring process procedure of a safety monitor device in accordance with Embodiment 3.

In Embodiments 1 and 2, no consideration is given to the moving velocity of the taught reference point during a period during which the two pieces of tool identification information are unequal. In Embodiment 3, the moving velocity of the taught reference point is further considered. A process procedure of the safety monitor device 100 as shown in FIG. 8 will be described. Steps S1 to S14 of the process procedure shown in FIG. 8 are substantially the same as those in Embodiment 1. In step S14-1, the moving velocity Q of the position coordinates B is computed from the position coordinates B computed in the past and the elapsed time. Step S15 to S20 of the process procedure in FIG. 8 are the same as those in Embodiment 1. In the case where the two pieces of tool identification information are unequal and the position coordinates S of the taught reference point exist in the predetermined region V, the answer to the determination in step S20 is YES, and subsequently it is determined in step S22 whether or not the moving velocity Q of the position coordinates S is greater than or equal to a predetermined value Th. If the moving velocity Q is greater than or equal to the predetermined value Th, the emergency stop signal is output in step S21. That is, even in the case where the taught reference point exists in a predetermined region, if the moving velocity of the taught reference point becomes greater than or equal to a predetermined velocity, it is determined that there is an abnormal state of some kind, and the emergency stop signal is output. That is, usually, during the period of tool change, the moving velocity of the taught reference point is considered slow. Therefore, if the moving velocity should become greater than or equal to the predetermined value during the period of tool change, an emergency stop is a safer choice of operation. In Embodiment 3, too, the position coordinates of the taught reference point may also be values computed from the actual values .alpha. on the axes, and the moving velocity thereof may also be found as a time-dependent rate of change of the computed values. Besides, the foregoing method of defining the predetermined region is applicable in Embodiment 3 as well.

Step S12 in FIGS. 3 and 8, the input interface 102, and the input interface 101 function as an action displacement amount input portion, and step S14 in FIGS. 3 and 8 functions as a position coordinates calculation portion, and step S11 in FIGS. 3 and 8, and the input interface 105 function as a first tool identification information input portion, and step S13 in FIGS. 3 and 8, and the input interface 106 function as a second tool identification information input portion, and step S15 in FIGS. 3 and 8 functions as a determination portion, and steps S17, S18 and S19 in FIGS. 3 and 8, and the predetermined region data region of the memory 104 function as a region setting portion, and steps S20, S21 in FIGS. 3 and 8, and step S22 in FIG. 8 as well as the output interface 103 function as an emergency stop signal output portion, and step S14-1 in FIG. 8 functions as a velocity computation portion.

[OTHER MODIFICATIONS] The embodiments of the invention are not limited to the foregoing embodiments, but may be further modified in various manners as exemplified below. Such modifications and applications will also achieve effects of the invention based on the operation of the invention.

The predetermined region in Embodiments 1, 2 and 3 may be set as different regions according to the tool identification information. Depending on the kinds of tools, the region in which safety is secured differs in some cases. Therefore, the size and the position of the predetermined region may be set according to the tool identification information. The positional relation between the reference coordinates S and the predetermined region V in Embodiment 1 may also be changed into a different relation according to the tool identification information. That is, instead of setting the predetermined region V so that the center thereof is positioned at the reference coordinates S with regard to all the tools, the position of the reference coordinates S within the predetermined region V may also be set separately for each piece of tool identification information.

What is claimed is:

1. A robot safety monitor device that monitors safety at a time of a tool change of a robot, comprising:
    a displacement receiving portion that receives a command value or an actual displacement value, the command value being output from a robot control device that controls the robot, the command value being a commanded displacement amount of a motor that drives each axis of the robot, the actual displacement value being output from a servo control device that drives each axis;
    a position coordinates calculation portion that calculates position coordinates of a reference point in an actual space of the robot that moves in association with a change in the command value or the actual displacement value, the position coordinates of the reference position based on the command value or the actual displacement value received by the displacement receiving portion;
    a first tool identification information receiving portion that receives first tool identification information which is output from the robot control device, the first tool identification information indicating a present tool as stored by the robot control device;
    a second tool identification information receiving portion that receives second tool identification information for detecting and identifying a tool currently attached to the robot;
    a determination portion that determines whether or not the first tool identification information and the second tool identification information are different by comparing the first tool identification information and the second tool identification information;
    a region setting portion that calculates a safety region if the tool has changed as determined by the determination portion, the safety region including a plurality of three dimensional volumes; and
    an emergency stop signal output portion, including a processor, that outputs an emergency stop signal for causing the robot to be in a safe state if it is determined by the determination portion that the first tool identification information and the second tool identification information are different and if the emergency stop signal output portion determines that the position coordinates of the reference point calculated by the position coordinates calculation portion are outside all of the plurality of three dimensional volumes of the safety region set by the region setting portion.

2. The robot safety monitor device according to claim 1, wherein the region setting portion sets as reference coordinates the position coordinates of the reference point that are calculated by the position coordinates calculation portion as occurring at a time when the first tool identification information and the second tool identification information are first detected to be different by the determination portion, and sets a region that contains the reference coordinates as the safety region.

3. The robot safety monitor device according to claim 2, further comprising:
a velocity computation portion that computes a velocity of the reference point from a time-dependent change of the position coordinates computed by the position coordinates calculation portion, wherein even in a case where the position coordinates of the reference point exist in the safety region during a period during which the first tool identification information and the second tool identification information are detected to be different by the determination portion, the emergency stop signal output portion outputs the emergency stop signal if the velocity calculated by the velocity computation portion becomes greater than or equal to a predetermined value.

4. The robot safety monitor device according to claim 1, wherein the region setting portion sets, as the safety region, a predetermined tool change region determined according to the tool identification information.

5. The robot safety monitor device according to claim 4, further comprising:
a velocity computation portion that computes a velocity of the reference point from a time-dependent change of the position coordinates calculated by the position coordinates calculation portion, wherein even in a case where the position coordinates of the reference point exist in the safety region during a period during which the first tool identification information and the second tool identification information are detected to be different by the determination portion, the emergency stop signal output portion outputs the emergency stop signal if the velocity calculated by the velocity computation portion becomes greater than or equal to a predetermined value.

6. The robot safety monitor device according to claim 1, wherein the region setting portion sets, as the safety region, a region defined by absolute coordinates that are fixed in the actual space of the robot.

7. The robot safety monitor device according to claim 6, further comprising:
a velocity computation portion that computes a velocity of the reference point from a time-dependent change of the position coordinates computed by the position coordinates calculation portion, wherein even in a case where the position coordinates of the reference point exist in the safety region during a period during which the first tool identification information and the second tool identification information are detected to be different by the determination portion, the emergency stop signal output portion outputs the emergency stop signal if the velocity calculated by the velocity computation portion becomes greater than or equal to a predetermined value.

8. The robot safety monitor device according to claim 1, wherein the reference point of the robot is a reference point that is defined relative to a moving member of the robot so as to specifically determine an action pathway of the robot.

9. The robot safety monitor device according to claim 8, wherein the reference point of the robot is at least one of a flange center point, a tool center point, a tool distal end point.

10. The robot safety monitor device according to claim 1, wherein the region setting portion calculates the safety region including the plurality of three dimensional volumes such that all of the plurality of three dimensional volumes have a same shape.

11. The robot safety monitor device according to claim 1, wherein the region setting portion calculates the safety region including the plurality of three dimensional volumes such that all of the plurality of three dimensional volumes are spherical.

12. The robot safety monitor device according to claim 1, wherein the region setting portion calculates the safety region including the plurality of three dimensional volumes such that all of the plurality of three dimensional volumes are rectangular parallelepipeds.

13. The robot safety monitor device according to claim 1, wherein the region setting portion calculates the safety region including the plurality of three dimensional volumes such that all of the plurality of three dimensional volumes are contiguous.

14. A robot safety monitor method that monitors safety during a tool change of a robot, comprising:
receiving a command value or an actual displacement value, the command value being output from a robot control device that controls the robot, the command value being a commanded displacement amount of a motor that drives each axis of the robot, the actual displacement value being output from a servo control device that drives each axis;
calculating position coordinates of a reference point in an actual space of the robot that moves in association with a change in the command value or the actual displacement value, the position coordinates of the reference position based on the command value or the actual displacement value;
receiving first tool identification information which is output from the robot control device, the first tool identification information indicating a present tool as stored by the robot control device;
receiving second tool identification information for detecting and identifying a tool currently attached to the robot;
determining whether or not the first tool identification information and the second tool identification information are different by comparing the first tool identification information and the second tool identification information;
calculating a safety region if the tool has changed as determined by the determining, the safety region including a plurality of three dimensional volumes; and
outputting, using a processor, an emergency stop signal for causing the robot to be in a safe state if during a period during which it is determined by the determining that the first tool identification information and the second tool identification information are different and the position coordinates of the reference point calculated by the position coordinates calculation portion are outside all of the plurality of three dimensional volumes of the safety region.

* * * * *